United States Patent
Bacic

(10) Patent No.: US 9,255,492 B2
(45) Date of Patent: Feb. 9, 2016

(54) GAS TURBINE ENGINE HAVING A MULTI-VARIABLE CLOSED LOOP CONTROLLER FOR REGULATING TIP CLEARANCE

(71) Applicant: ROLLS-ROYCE PLC, London (GB)

(72) Inventor: Marko Bacic, Oxford (GB)

(73) Assignee: ROLLS-ROYCE plc, London (GB)

( * ) Notice: Subject to any disclaimer, the term of this patent is extended or adjusted under 35 U.S.C. 154(b) by 495 days.

(21) Appl. No.: 13/682,122

(22) Filed: Nov. 20, 2012

(65) Prior Publication Data

US 2013/0152601 A1    Jun. 20, 2013

(30) Foreign Application Priority Data

Dec. 14, 2011 (GB) .................................. 1121426.9

(51) Int. Cl.
*F01D 5/08* (2006.01)
*F02C 7/18* (2006.01)
(Continued)

(52) U.S. Cl.
CPC ................ *F01D 11/24* (2013.01); *F01D 5/081* (2013.01); *F01D 17/02* (2013.01); *F01D 17/085* (2013.01);
(Continued)

(58) Field of Classification Search
CPC ....... F01D 11/24; F01D 17/02; F01D 17/085; F01D 11/14; F02C 6/08; F02C 3/13; F02C 7/18; F02C 9/18
See application file for complete search history.

(56) References Cited

U.S. PATENT DOCUMENTS 3,267,946 A    8/1966 Adams et al.
4,254,618 A    3/1981 Elovic
(Continued)

FOREIGN PATENT DOCUMENTS

EP    0231952 A2    8/1987
EP    1754861 A2    2/2007
(Continued)

OTHER PUBLICATIONS

Jan. 26, 2015 Search Report issued in European Application No. 12193313.
(Continued)

*Primary Examiner* — Phutthiwat Wongwian
*Assistant Examiner* — William Breazeal
(74) *Attorney, Agent, or Firm* — Oliff PLC

(57) ABSTRACT

A gas turbine engine has, in flow series, a compressor section, a combustor, and a turbine section. The gas turbine engine further has a system (i) for cooling the turbine section and (ii) for providing tip clearance control between turbine blades of the turbine section and a plurality of circumferentially distributed segments which form an annular shroud surrounding the outer tips of the turbine blades. The system includes a turbine section cooling sub-system which diverts a first cooling air flow received from the compressor section to a heat exchanger and then to the turbine section to cool components thereof. The first cooling air flow by-passes the combustor and is cooled in the heat exchanger. The turbine section cooling subsystem has a first valve arrangement which regulates the first cooling air flow. The system further includes a tip clearance control sub-system which supplies a second cooling air flow to an engine case to which the segments are mounted. The second cooling air flow regulates thermal expansion of the case and thereby controls the clearance between the segments and the outer tips. The tip clearance control sub-system has a second valve arrangement which regulates the second cooling air flow. The system further includes a closed-loop controller which issues first and second demand signals to respectively the first and the second valve arrangements. Each of the first and second demand signals are determined on the basis of: (i) a value of the first demand signal at a previous time step, and a measurement or estimate of turbine section component temperature, and (ii) a value of the second demand signal at a previous time step, and a measurement or estimate of tip clearance.

10 Claims, 4 Drawing Sheets

(51) Int. Cl.
  F01D 25/14 (2006.01)
  F01D 11/24 (2006.01)
  F01D 17/02 (2006.01)
  F01D 17/08 (2006.01)
  F02C 6/08 (2006.01)
  F02C 3/13 (2006.01)
  F02C 9/18 (2006.01)

(52) U.S. Cl.
  CPC . F01D 25/14 (2013.01); F02C 3/13 (2013.01); F02C 6/08 (2013.01); F02C 7/18 (2013.01); F02C 7/185 (2013.01); F02C 9/18 (2013.01); *F05D 2260/205* (2013.01); *F05D 2270/303* (2013.01); *F05D 2270/305* (2013.01); *F05D 2270/44* (2013.01)

(56) References Cited

U.S. PATENT DOCUMENTS

| | | | |
|---|---|---|---|
| 4,419,044 A | | 12/1983 | Barry et al. |
| 4,967,552 A | * | 11/1990 | Kumata et al. .......... 60/806 |
| 5,048,288 A | | 9/1991 | Bessette et al. |
| 6,487,491 B1 | | 11/2002 | Karpman et al. |
| 2005/0109016 A1 | | 5/2005 | Ullyott |
| 2008/0112798 A1 | * | 5/2008 | Seitzer et al. ........... 415/144 |
| 2009/0226301 A1 | * | 9/2009 | Priestman et al. ....... 415/145 |
| 2010/0017093 A1 | * | 1/2010 | Mahmood ............... 701/100 |
| 2010/0290889 A1 | * | 11/2010 | Fedor ...................... 415/47 |

FOREIGN PATENT DOCUMENTS

EP 1923539 A2 5/2008
EP 2 119 892 A2 11/2009

OTHER PUBLICATIONS

Search Report issued in British Application No. 1121426.9 dated Mar. 26, 2012.

\* cited by examiner

GAS TURBINE ENGINE HAVING A MULTI-VARIABLE CLOSED LOOP CONTROLLER FOR REGULATING TIP CLEARANCE

FIELD OF THE INVENTION

The present invention relates to a closed-loop controller, and, in particular, to a gas turbine engine having a system including such a controller for cooling the turbine section of the gas turbine and for providing tip clearance control.

BACKGROUND OF THE INVENTION

With reference to FIG. 1, a ducted fan gas turbine engine generally indicated at 10 has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

The high pressure turbine components of an aero gas turbine engine are located in the hottest part of the engine. At around 1600° C., the temperature of the gas stream is greater than the melting temperature of the nickel-based alloys from which the high pressure turbine nozzle guide vanes and rotor blades are typically cast.

It is usual, therefore, to cool nozzle guide vanes and rotor blades internally using cooling air taken from the exit of the high pressure compressor. The cooling air, which bypasses the combustor, may nonetheless be at a temperature of over 700° C. on exit from the compressor section. However, the cooling air, even if returned into the flow path of the turbine downstream of the combustor, does not return a full measure of work to the operation of the turbine. Thus, the greater the amount of cooling air that is extracted, the greater the associated loss in engine efficiency.

One method of reducing the cooling air requirement is to cool the cooling air before it enters the high pressure turbine components. This can be achieved by putting the cooling air in heat exchange relationship with a cooler fluid. For example, many aero gas turbine engines have a bypass air stream which can serve as the cooler fluid. In conventional arrangements, a portion of that air stream is diverted at an offtake into a duct in which the heat exchanger is located. The diverted portion of air, after having passed over the heat exchanger, is then returned to the main bypass air stream.

U.S. Pat. No. 4,254,618 proposes bleeding cooling air from the compressor discharge of a turbofan engine, and routing the cooling air to a heat exchanger located in a diffuser section of the fan duct. The cooled cooling air is then routed through compressor rear frame struts to an expander nozzle and thence to the turbine.

Efficient operation of rotors is also promoted by reducing the leakage of working fluid between the engine casing and the tips of the rotor blades. For example, engine-casing cooling systems allow the clearance between a turbine stage casing and the rotor blade tips of the stage to be adjusted so that tip clearance, and hence tip leakage, can be reduced.

In large civil aero engines, engine casing cooling air is typically taken from the fan stream or from an early compressor stage. It is then fed to a manifold which encircles the engine at or near the plane of the target turbine stage. On exit from the manifold, the air impinges on the outside of the turbine stage casing, causing it to contract and reduce the rotor blade tip clearance.

U.S. Pat. No. 5,048,288 proposes a turbine tip clearance control arrangement in which the outer air seal of a gas turbine engine is continuously cooled by compressor discharge air and by a by-pass line which can be throttled or shut off.

U.S. Pat. No. 6,487,491 proposes closed-loop tip clearance control, in which case the tip clearance of the engine is monitored during flight, including take off and landing, and adjusted by controlling air flow adjacent the engine casing in response to thermal growth.

US 2008/0112798 proposes a gas turbine engine having a heat exchanger used for cooling pressurized air bled from the compressor. A distribution network joins the heat exchanger to the turbine for selectively channelling air from the heat exchanger below the blades and above the shroud for controlling blade tip clearance.

SUMMARY OF THE INVENTION

It would be desirable to increase the efficiency of engines that have both cooled cooling air systems and tip clearance control systems.

The present invention is at least partly based on a recognition that the cooled cooling air affects component (e.g. disc) thermal growth and thus impacts tip clearance. Therefore cooled cooling air systems and tip clearance control systems should preferably be operated in a manner which takes this dependence into account.

Accordingly, in a first aspect, the present invention provides a gas turbine engine having, in flow series, a compressor section, a combustor, and a turbine section, and further having a system (i) for cooling the turbine section and (ii) for providing tip clearance control between turbine blades of the turbine section and a plurality of circumferentially distributed segments which form an annular shroud surrounding the outer tips of the turbine blades, the system including:

a turbine section cooling sub-system which diverts a first cooling air flow received from the compressor section to a heat exchanger and then to the turbine section to cool components thereof, the first cooling air flow by-passing the combustor and being cooled in the heat exchanger, and the turbine section cooling subsystem having a first valve arrangement which regulates the first cooling air flow;

a tip clearance control sub-system which supplies a second cooling air flow to an engine case to which the segments are mounted, the second cooling air flow regulating thermal expansion of the case and thereby controlling the clearance between the segments and the outer tips, and the tip clearance control sub-system having a second valve arrangement which regulates the second cooling air flow; and a closed-loop controller which issues first and second demand signals to respectively the first and the second valve arrangements, each of the first and second demand signals being determined on the basis of: (i) a value of the first demand signal at a previous time step, and a measurement or estimate of a turbine section component (e.g. turbine disc) temperature, and (ii) a value of the second demand signal at a previous time step, and a measurement or estimate of tip clearance.

Advantageously, by determining each of the first and second demand signals on the basis of: (i) a value of the first demand signal at a previous time step, and a measurement or estimate of turbine section component temperature, and (ii) a value of the second demand signal at a previous time step, and a measurement or estimate of tip clearance, inter-relations between the turbine section cooling sub-system and the tip clearance control sub-system can be taken into account, improving the overall efficiency of the engine and/or increasing component life.

In a second aspect, the present invention provides the closed-loop controller of the first aspect.

Optional features of the invention will now be set out. These are applicable singly or in any combination with any of the above aspects of the invention.

Typically, each of the first and second demand signals may be determined on the basis of: (i) values of the first demand signal at plural previous time steps, and a measurement or estimate of the turbine section component temperature, and (ii) values of the second demand signal at plural previous time steps, and a measurement or estimate of tip clearance. Indeed, the determination can further be on the basis of plural measurements or estimates (of the turbine section component temperature and/or tip clearance), for example at the present time and at previous time steps.

The controller may include:

(a) a control unit which calculates each of the first and the second demand signals from a plurality of error variables received by the control unit, from the value of the first demand signal at the previous time step (optionally from values of the first demand signal at plural previous time steps), and from the value of the second demand signal at the previous time step (optionally from values of the second demand signal at plural previous time steps), (b) an observer unit which measures or estimates the turbine section component (e.g. turbine disc) temperature, measures or estimates the tip clearance, and provides observer variables based on the measurements or estimates, and (c) a comparator unit which compares the observer variables with corresponding target variables to determine the error variables, which are then issued to the control unit.

One of the observer variables provided by the observer unit may be a turbine section component (e.g. turbine disc or blade) temperature, and the corresponding target variable may be a target turbine section component (e.g. turbine disc or blade) temperature. For example, the observer unit can include a turbine section component temperature model which estimates the component temperature observer variable from engine state measurements (including, for example, measurements of component cooling air temperature at the present time and typically also previous time steps), and optionally also from the value of the first demand signal at the previous time step. However, another option is that the observer unit can include a temperature sensor which measures the turbine section component temperature (e.g. as an average temperature or at one or more points on the component), and then provides a measured temperature as the component temperature observer variable.

One of the observer variables provided by the observer unit may be a tip clearance, and the corresponding target variable may be a target tip clearance. For example, the observer unit can include a tip clearance model which estimates the tip clearance observer variable from engine state measurements (including, for example, measurements of engine case cooling air temperature at the present time and typically also previous time steps), and optionally also from the value of the second demand signal at the previous time step. However, another option is that the observer unit can include a tip clearance sensor which measures the tip clearance, and then provides the measured clearance as the tip clearance observer variable.

As mentioned above, the observer unit can include a turbine section component temperature model and/or a tip clearance model. As an alternative or in addition to providing a temperature and/or a tip clearance observer variable, the observer variables determined by the observer unit can then include a plurality of engine state variables, the corresponding target control values being target engine state variables. For example, the engine state variables can include any one or any combination of: disc growth, shroud growth, casing growth, blade growth, component (e.g. disc) temperature, component (e.g. disc) stress and blade temperature.

Preferably, the components of the turbine section cooled by the first cooling air flow include a turbine disc.

Preferably, the first valve arrangement includes one or more switched vortex valves.

Preferably, the heat exchanger is located in a bypass air stream of the engine, such as in the fan duct of a turbofan engine.

In a third aspect, the present invention provides a method of operating a gas turbine engine having, in flow series, a compressor section, a combustor, and a turbine section, the method including the steps of:

diverting a first cooling air flow received from the compressor section to a heat exchanger and then to the turbine section to cool components thereof, the first cooling air flow by-passing the combustor and being cooled in the heat exchanger;

supplying a second cooling air flow to an engine case to which a plurality of circumferentially distributed segments are mounted, the segments forming an annular shroud around the outer tips of turbine blades of the turbine section, and the second cooling air flow regulating thermal expansion of the case and thereby controlling a tip clearance between the segments and the outer tips; and issuing first and second demand signals to respectively first and second valve arrangements, the first valve arrangement regulating the first cooling air flow and the second valve arrangement regulating the second cooling air flow, each of the first and second demand signals being determined on the basis of: (i) a value of the first demand signal at a previous time step, and a measurement or estimate of a turbine section component (e.g. turbine disc) temperature, and (ii) a value of the second demand signal at a previous time step, and a measurement or estimate of tip clearance.

The method of the third aspect thus corresponds to the gas turbine engine of the first aspect, and can be performed using that engine. Optional features of the first aspect are applicable singly or in any combination with the third aspect of the invention.

For example, the issuing step may include the sub-steps of:
measuring or estimating the turbine section component temperature,
measuring or estimating the tip clearance,
providing observer variables based on the measurements or estimates,
comparing the observer variables with corresponding target variables to determine a plurality of error variables,
calculating each of the first and the second demand signals from the error variables, from the value of the first demand signal at the previous time step (optionally from values of the first demand signal at plural previous time steps), and from the value of the second demand signal at the previous time step (optionally from values of the second demand signal at plural previous time steps), and
issuing the first and second demand signals to respectively the first and second valve arrangements.

Further optional features of the invention are set out below.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

In a gas turbine engine that has both a cooled cooling air system and tip clearance control system, the two systems do not operate independently of each other. For example, when the tip clearance decreases, the turbine entry temperature can also decrease, as the engine is able to operate more efficiently. However, a lower turbine entry temperature needs different turbine blade and turbine disc cooling flows, placing different requirements on the cooled cooling air flow. A reduced cooled cooling air flow tends to decrease the tip clearance due to less thermal shrinkage of the disc and blades.

Figure 1:
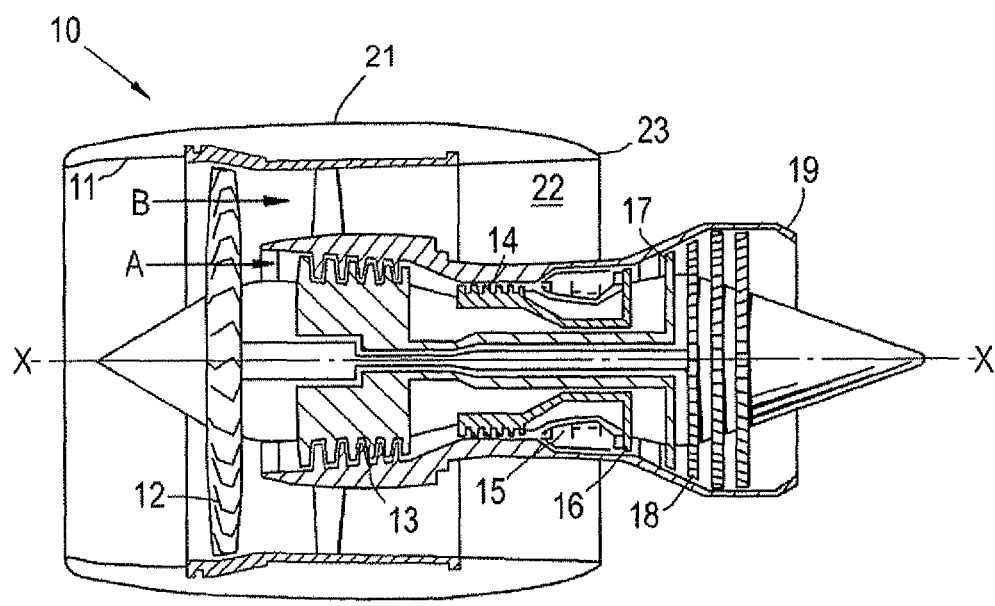
FIG. 1 shows a schematic longitudinal cross-section through a ducted fan gas turbine engine.
Figure 2:
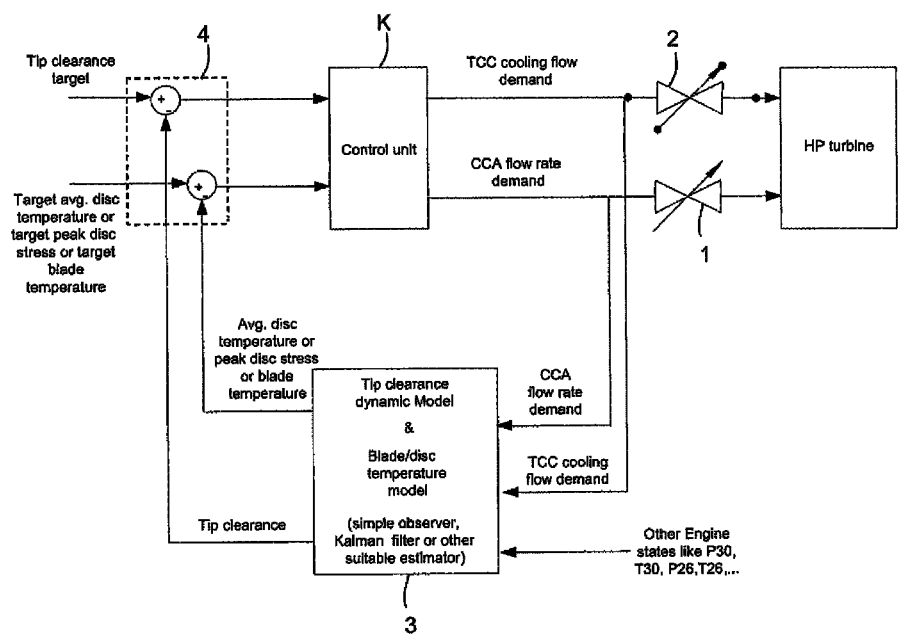
FIG. 2 shows schematically a system according to a first embodiment for cooling the high pressure turbine of a gas turbine engine and for providing tip clearance control in the high pressure turbine.

FIG. 2 shows schematically a system according to a first embodiment for cooling the high pressure turbine of a gas turbine engine and for providing tip clearance control in the high pressure turbine. The system includes a closed-loop control unit K which is a multivariable controller acting on error variables, s. The control unit embodies a gain matrix, K(s), of the form:

$$K(s) = \begin{bmatrix} K_{11}(s) & K_{12}(s) \\ K_{21}(s) & K_{22}(s) \end{bmatrix}$$

to produce a cooled cooling air (CCA) flow rate demand signal and a turbine clearance control (TCC) flow demand signal which are issued to respectively a valve 1 of a turbine section cooling sub-system and a valve 2 of a tip clearance control sub-system. The valves can be, for example, switched vortex valve of the type described in U.S. Pat. No. 3,267,946.

The gain matrix allows independencies between the CCA and TCC sub-systems to be introduced. The gain matrix can be determined, for example, by a robust control methodology, simple decoupled PI control laws, a linear quadratic regulator controller, multivariable root locus pole placement, or other approaches known to the skilled person. The gain transfer function matrix may not necessarily be single valued, but may be parametrised in terms of any one or combination of, for example, altitude, speeds, pressures etc. Indeed, the gain matrix is only one of many possible implementations of the multivariable controller that are known to the skilled person. Other implementations include, for example, state-feedback described in the time domain.

The control unit K is a closed-loop multivariable controller. Thus the CCA flow rate demand signal and the TCC flow demand signal issued by the control unit at previous time steps are also used by the controller to determine the current demand signals.

In addition, the CCA flow rate demand signal and the TCC flow demand signal are sent to observer unit 3, which also receives other engine states, such as high pressure compressor outlet pressure P30 and temperature T30, high pressure compressor inlet pressure P26 and temperature T26 etc.

The observer unit 3 uses a dynamic model of disc/blade temperature to estimate an average disc or blade temperature at the next time step. The model can also be extended to estimate a peak disc stress resulting from the disc temperature. The observer unit also uses a dynamic model of tip clearance to estimate a tip clearance at the next time step. The models can be simple observer models, Kalman filters or other suitable estimators known to the skilled person.

A first observer variable, which is the estimated average disc or blade temperature or disc stress, is then sent to a comparator unit 4, in the form of a summing junction, where the estimate is compared with a corresponding temperature or stress target variable, the temperature/stress error being sent to the control unit K. Likewise, a second observer variable, which is the estimated tip clearance, is sent to the comparator unit, compared with a corresponding tip clearance target variable, and the tip clearance error is sent to the control unit.

Figure 3:
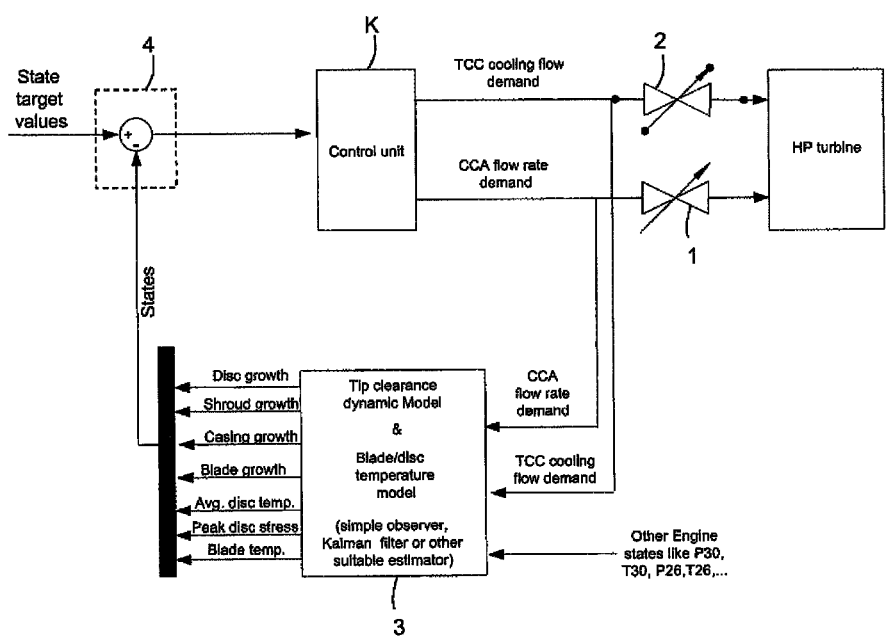
FIG. 3 shows schematically a system according to a second embodiment for cooling the high pressure turbine of a gas turbine engine and for providing tip clearance control in the high pressure turbine.

The embodiment of FIG. 2 uses a dynamic model of disc/blade temperature or disc stress and a dynamic model of tip clearance for estimation purposes. Such models typically have a number of other internal states. Thus instead of the observer unit 3 sending temperature/stress and tip clearance estimates to the comparator unit 4, it is possible to implement state-feedback, using the internal states of the model, as shown schematically in the embodiment of FIG. 3. In this embodiment, estimated states can include such variables as disc growth, shroud growth, casing growth, blade growth, average disc temperature, peak disc stress, blade temperature. The comparator unit can receive corresponding target variables.

In such an embodiment, if there are N state variables producing N errors variables, the multivariable controller can be of the form:

$$\begin{bmatrix} TCCdemand \\ CCAdemand \end{bmatrix} = \begin{bmatrix} K_{11}(s) & K_{12}(s) & \ldots & K_{1N}(s) \\ K_{21}(s) & K_{22}(s) & \ldots & K_{2N}(s) \end{bmatrix} \begin{bmatrix} error_1 \\ error_2 \\ \vdots \\ error_N \end{bmatrix}$$

and a linear quadratic regulator can be used to choose the gains of the gain matrix, K(s).

Like the first embodiment, the gains may be parametrised in terms of any one or combination of, for example, altitude, speeds, pressures etc.

Figure 4:
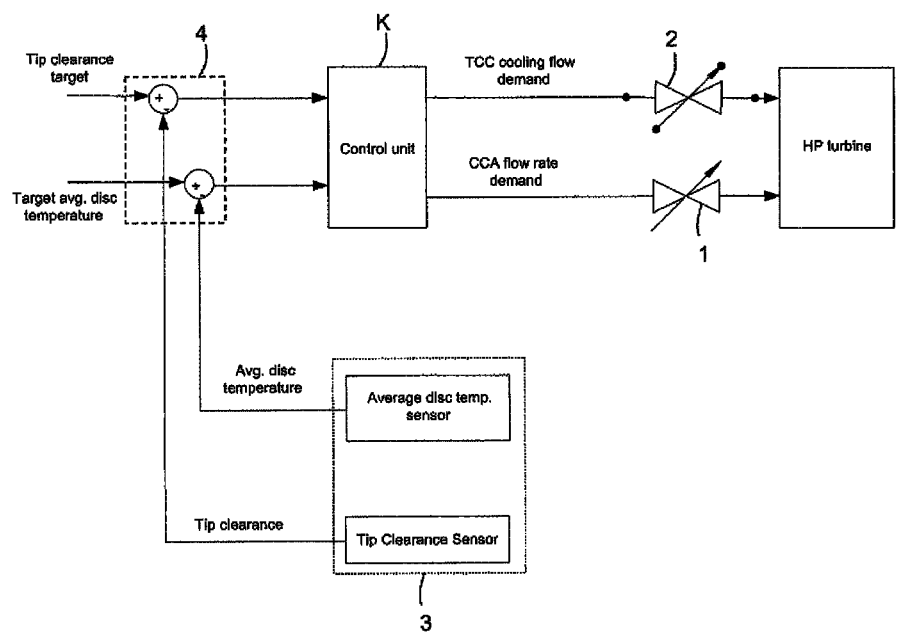
FIG. 4 shows schematically a system according to a third embodiment for cooling the high pressure turbine of a gas turbine engine and for providing tip clearance control in the high pressure turbine.

An alternative to estimating the observer variables is to provide closed-loop control which uses actual variable measurements. FIG. 4 shows schematically a system according to a third embodiment which implements this approach. A pyrometer and a tip clearance sensor respectively provide measurements of average disc temperature and tip clearance. These measurements are then the observer variables which are sent to the comparator 4 for comparison with respectively a target average disc temperature and a target tip clearance.

Another option is to adopt the modelling approach for e.g. disc/blade temperature or disc stress and adopt the measurement approach for tip clearance, or vice versa. Indeed, it is possible to improve the accuracy of the observer unit 3 by supplementing the modelling approach of e.g. the first or second embodiment with the direct measurement approach of the third embodiment.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A gas turbine engine having, in flow series, a compressor section, a combustor, and a turbine section, and further having a system (i) for cooling the turbine section and (ii) for providing tip clearance control between turbine blades of the turbine section and circumferentially distributed segments which form an annular shroud surrounding outer tips of the turbine blades, the system including:
a turbine section cooling sub-system which diverts a first cooling air flow received from the compressor section to a heat exchanger and then to the turbine section to cool components thereof, the first cooling air flow by-passing the combustor and being cooled in the heat exchanger, and the turbine section cooling sub-system having a first valve arrangement which regulates the first cooling air flow;
a tip clearance control sub-system which supplies a second cooling air flow to an engine case to which the circumferentially distributed segments are mounted, the second cooling air flow regulating thermal expansion of the engine case and thereby controlling a tip clearance between the circumferentially distributed segments and the outer tips of the turbine blades, and the tip clearance control sub-system having a second valve arrangement which regulates the second cooling air flow;
and a closed-loop controller configured to issue first and second demand signals to respectively the first and the second valve arrangements, each of the first and second demand signals being determined on the basis of: (i) a value of the first demand signal at at least one previous time step, and a measurement or estimate of a turbine section component temperature, and (ii) a value of the second demand signal at at least one previous time step, and a measurement or estimate of tip clearance.

2. The gas turbine engine according to claim 1, wherein the closed-loop controller includes (a) a control unit which calculates each of the first and the second demand signals from a plurality of error variables received by the control unit, from the value of the first demand signal at the at least one previous time step, and from the value of the second demand signal at the at least one previous time step, (b) an observer unit which measures or estimates the turbine section component temperature, measures or estimates the tip clearance, and provides observer variables based on the measurements or estimates, and (c) a comparator unit which compares the observer variables with corresponding target variables to determine the error variables, which are then issued to the control unit.

3. The gas turbine engine according to claim 2, wherein one of the observer variables provided by the observer unit is a measurement or estimate of the turbine section component temperature, and a corresponding target variable is a target turbine section component temperature.

4. The gas turbine engine according to claim 2, wherein one of the observer variables provided by the observer unit is a measurement or estimate of the tip clearance, and a corresponding target variable is a target tip clearance.

5. The gas turbine engine according to claims 2, wherein the observer unit includes a turbine section component temperature model and/or a tip clearance model, and the observer variables determined by the observer unit include a plurality of engine state variables, the corresponding target control values being target engine state variables.

6. The gas turbine engine according to claim 1, wherein the first valve arrangement includes one or more switched vortex valves.

7. The gas turbine engine according to claim 1, wherein the heat exchanger is located in a bypass air stream of the gas turbine engine.

8. The gas turbine engine according to claim 1, wherein the closed-loop controller is configured to issue the first and second demand signals to respectively the first and the second valve arrangements, each of the first and second demand signals being determined on the basis of: (i) the value of the first demand signal at a first time step, and the measurement or estimate of the turbine section component temperature, and (ii) the value of the second demand signal at the first time step, and the measurement or estimate of tip clearance.

9. A method of operating a gas turbine engine having, in flow series, a compressor section, a combustor, and a turbine section, the method including the steps of:
diverting a first cooling air flow received from the compressor section to a heat exchanger and then to the turbine section to cool components thereof, the first cooling air flow by-passing the combustor and being cooled in the heat exchanger;
supplying a second cooling air flow to an engine case to which circumferentially distributed segments are mounted, the circumferentially distributed segments forming an annular shroud around outer tips of turbine blades of the turbine section, and the second cooling air flow regulating thermal expansion of the engine case and thereby controlling a tip clearance between the circumferentially distributed segments and the outer tips;
and issuing first and second demand signals to respectively first and second valve arrangements, the first valve arrangement regulating the first cooling air flow and the second valve arrangement regulating the second cooling air flow, each of the first and second demand signals being determined on the basis of: (i) a value of the first demand signal at at least one previous time step, and a measurement or estimate of turbine section component temperature, and (ii) a value of the second demand signal at at least one previous time step, and a measurement or estimate of tip clearance.

10. The method according to claim 9, wherein the issuing step includes the sub-steps of:
measuring or estimating the turbine section component temperature,
measuring or estimating the tip clearance,
providing observer variables based on the measurements or estimates,
comparing the observer variables with corresponding target variables to determine a plurality of error variables,
calculating each of the first and the second demand signals from the error variables, from the value of the first demand signal at the at least one previous time step, and from the value of the second demand signal at the at least one previous time step, and
issuing the first and second demand signals to respectively the first and second valve arrangements.

* * * * *